United States Patent [19]
Ma et al.

[11] Patent Number: 5,946,166
[45] Date of Patent: Aug. 31, 1999

[54] ACTUATOR HAVING ASYMMETRIC MAGNETIC FLUX STRENGTH

[75] Inventors: Yiping Ma; John C. Briggs, both of Layton, Utah

[73] Assignee: Iomega Corporation, Roy, Utah

[21] Appl. No.: 08/976,816

[22] Filed: Nov. 24, 1997

[51] Int. Cl.[6] ........................................... G11B 5/55
[52] U.S. Cl. ............................................... 360/106
[58] Field of Search .................................. 360/104–106

[56] References Cited

U.S. PATENT DOCUMENTS 4,908,816  3/1990  Champagne ............................ 360/106

*Primary Examiner*—A. J. Heinz
*Attorney, Agent, or Firm*—Woodcock Washburn Kurtz MacKiewicz & Norris LLP

[57] ABSTRACT

An actuator carriage assembly for carrying read/write heads into engagement with a storage medium while eliminating resonance of the actuator carriage assembly is provided. The actuator carriage assembly comprises a carriage having read/write heads, the heads being mounted on the end of the carriage, and a magnetic circuit for driving the carriage and heads into and out of engagement with the storage medium. The magnetic circuit comprises a coil mounted on the carriage, a first magnet located on a first side of the actuator carriage assembly and a second magnet located on a second side of the actuator carriage assembly. The magnets or the sides of the actuator carriage assembly are biased so that the magnetic flux from the first side is stronger than that from the second side. In an actuator carriage assembly for carrying read/write heads into engagement with a storage medium, a method for eliminating resonance in the actuator carriage assembly is also provided.

9 Claims, 4 Drawing Sheets

ACTUATOR HAVING ASYMMETRIC MAGNETIC FLUX STRENGTH

The present invention relates to data storage devices, or disk drives, for storing digital information, and more particularly, to controlling actuator resonance.

BACKGROUND OF THE INVENTION

Disk drives for storing electronic information are found in a wide variety of computer systems, including workstations, personal computers, and laptop and notebook computers. Such disk drives can be stand-alone units which are connected to a computer system by cable, or they can be internal units which occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type which accept removable disk cartridges have become increasingly popular. One disk drive product which has been very successful is the ZIP™ drive designed and manufactured by Iomega Corporation, the assignee of the present invention. ZIP™ drives accept removable disk cartridges which contain a flexible magnetic storage medium upon which information can be written and read. The disk-shaped storage medium is mounted on a hub which rotates freely within the cartridge. A spindle motor within the ZIP™ drive engages the cartridge hub when the cartridge is inserted into the drive in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems.

Additional features of an exemplary drive in which the present invention can be employed is demonstrated in commonly assigned applications: Ser. No. 08/866,189, filed on May 30, 1997, entitled "An Improved Operating System For Operating An Eject System And A Head Retraction System Of A Disk Drive" (Attorney Docket No. IOM-9460); Ser. No. 08/866,225, filed on May 30, 1997, entitled "An Improved Head Retraction System for Retracting The Heads Of A Disk Drive" (Attorney Docket No. IOM-9464); Ser. No. 08/866,190, filed on May 30, 1997, entitled "Dual Loop Flex Circuit for a Linear Actuator" (Attorney Docket No. IOM-9509); Ser. No. 08/866,177, filed on May 30, 1997, entitled "Motor Loading System For A Disk Drive" (Attorney Docket No. IOM-9526); and Ser. No. 08/866,226, filed on May 30, 1997, entitled "An Improved Eject System For Ejecting A Disk Cartridge From A Disk Drive" (Attorney Docket No. IOM-9527), all of which are hereby incorporated herein by reference in their entirety.

Disk drives often employ linear actuators for positioning read/write heads of the disk drive over the surfaces of the storage media. Actuator carriage assemblies are used to carry the heads for magnetic disk drives, CD players, and optical drive devices. FIG. 1 shows a perspective view of an exemplary disk drive in cooperation with a magnetic circuit 2 and an actuator carriage assembly 20. FIG. 1 also shows the hub 4 where the rotating storage media is situated. This placement of the storage media allows for the read/write heads 8 of the actuator carriage assembly 20 to access the inner and outer tracks of the storage media. The forces which drive the actuator carriage assembly 20 are typically generated by a magnetic circuit 2 comprising a return path assembly, a pair of magnets, and a voice coil.

FIG. 2 shows an underside view of an exemplary magnetic circuit 2 and an actuator carriage assembly 20. Magnetic fields 14A and 14B exist around the pair of magnets 10A and 12B. The direction of the magnetic fields 14A and 14B is from the north pole 10N and 12N of each magnet 10A and 12B to the south pole 10S and 12S of each magnet 10A and 12B, respectively. The return path assembly, comprising the outer return path 16A and 16B and the inner return path 18A and 18B, serves as a channel for the magnetic flux because of its high permeability. It also helps to contain the magnetic fields around the magnets such that the actuator magnets do not influence the magnetic read/write elements of the recording heads.

Referring to a first side of the actuator carriage assembly, i.e., the side containing magnet 10A, the magnetic flux 14A leaves the north pole 10N of the magnet 10A, passing through the outer return path 16A, the inner return path 18A and across the air gap 19A between the inner return path 18A and the magnet 10A, returning to the magnet 10A on its south pole 10S. Notice that on the first side, the magnetic flux 14A crosses the gap 19A in the negative y direction while the magnetic flux on the second side, i.e., the side with magnet 12B, crosses the gap 19B in the positive y direction.

A voice coil 28 is attached to the actuator carriage assembly 20 with a portion of the coil 28 wound through the gaps 19A and 19B between magnets 10A and 12B and the inner return paths 18A and 18B, respectively. When a current is supplied to the voice coil 28, magnetic forces are generated on the voice coil 28 due to the presence of the magnetic fields 14A and 14B, which in turn move the actuator carriage assembly 20.

FIG. 3 shows the cross-sectional view of the actuator carriage assembly of FIG. 2 at line 3–3'. When the current 32 is flowing in the clockwise direction, forces 22 generated on the voice coil 28 and thereby the actuator carriage assembly 20 are in the positive x direction. To reverse the direction of the motion of the actuator carriage assembly, the direction of the current 32 in the voice coil 28 is reversed.

When the actuator carriage assembly 20 is called on to position the read/write heads 8 over the inner tracks of the storage media, i.e., the surface of the storage media at its inner diameter, the current 32 is directed around the voice coil 28 in a clockwise direction. The actuator carriage assembly is thereby forced forward (in the positive x direction as shown in FIG. 2) along the center rod 24, as shown in FIG. 2, toward the inner diameter of the storage media.

One problem that's been observed with disk drives of the design described above is resonance of the actuator carriage assembly when the read/write heads 8 are accessing the inner tracks on the inside diameter of the storage media. Particularly, this actuator resonance has been observed on ZIP™ drives with center rods 24 of 0.7 mm in diameter. Resonance of the actuator carriage assembly could cause the read/write heads 8 fail to maintain proper positioning on certain tracks of the rotating storage media, thus making the actuator non-operational. When accessing the inner tracks of the storage media, the actuator may sway or vibrate tangentially to the rotating media, yielding a position error signal which can increase in an uncontrollable fashion. Thus, it is desirable to provide a magnetic circuit for an actuator carriage assembly which prevents actuator resonance.

SUMMARY OF THE INVENTION

An actuator carriage assembly for carrying read/write heads into engagement with a storage medium while eliminating resonance of the actuator carriage assembly is provided. The actuator carriage assembly comprises a carriage having read/write heads, the heads being mounted on the end of the carriage, and a magnetic circuit for driving the carriage and heads into and out of engagement with the storage medium. The magnetic circuit comprises a coil mounted on the carriage, a first magnet located on a first side of the actuator carriage assembly and a second magnet located on a second side of the actuator carriage assembly. The magnets or the sides of the actuator carriage assembly are biased so that the magnetic flux from the first side of the actuator carriage assembly is stronger than that from the second side.

In one embodiment of the present invention the first magnet is stronger than that of the second magnet. In another embodiment of the present invention the first magnet is placed in a position slightly more forward than the position of said second magnet, the forward direction being the direction in which the heads move toward the storage medium.

In another embodiment of the present invention the first side of the actuator carriage assembly has a stronger magnetic flux than the second side of the actuator carriage assembly. This last embodiment encompasses various alternative embodiments in which either an additional magnet is placed on the first side of the actuator carriage assembly to strengthen the magnetic flux from the first side or an additional magnet is placed on the second side of the actuator carriage assembly to weaken the magnetic flux from the second side.

In an actuator carriage assembly for carrying read/write heads into engagement with a storage medium, a method for eliminating resonance of the actuator carriage assembly is also provided. The method comprises the step of either making the first magnet stronger than the second magnet, placing the first magnet in a position slightly more forward than the position of said second magnet, or making the magnetic flux on the first side of the actuator carriage assembly stronger than the magnetic flux on said second side of the actuator carriage assembly.

DETAILED DESCRIPTION OF THE PREFERRED EMBODIMENTS

Figure 1:
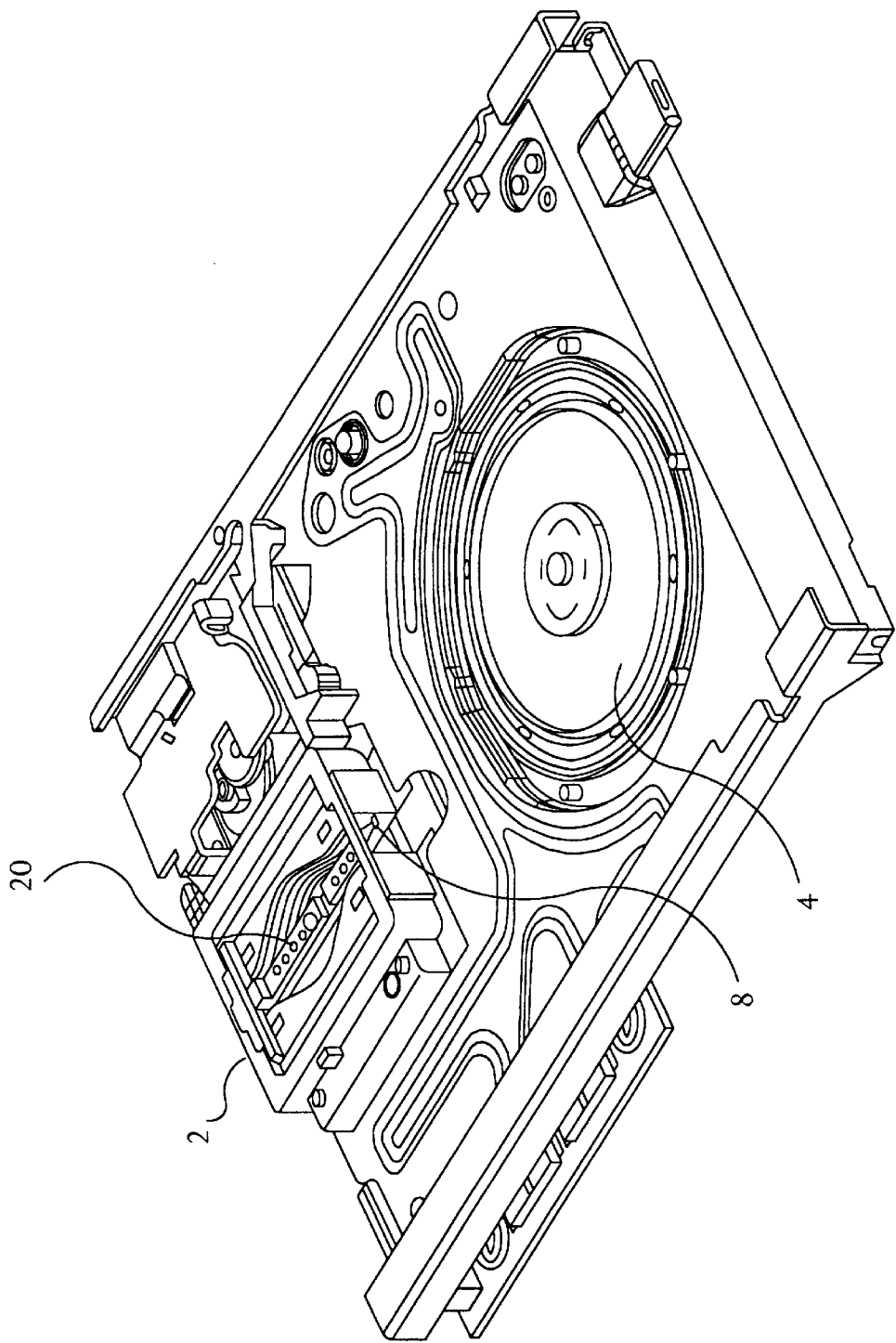
FIG. 1 is a perspective view of an exemplary disk drive in cooperation with a magnetic circuit and an actuator carriage assembly.
Figure 3:
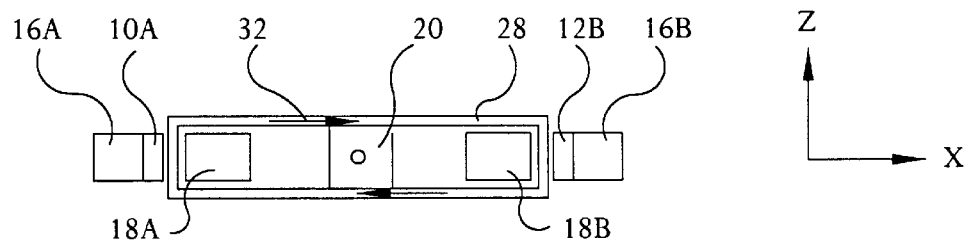
FIG. 3 is a cross-sectional view of the actuator carriage assembly of FIG. 2 at line 3–3'.
Figure 2:
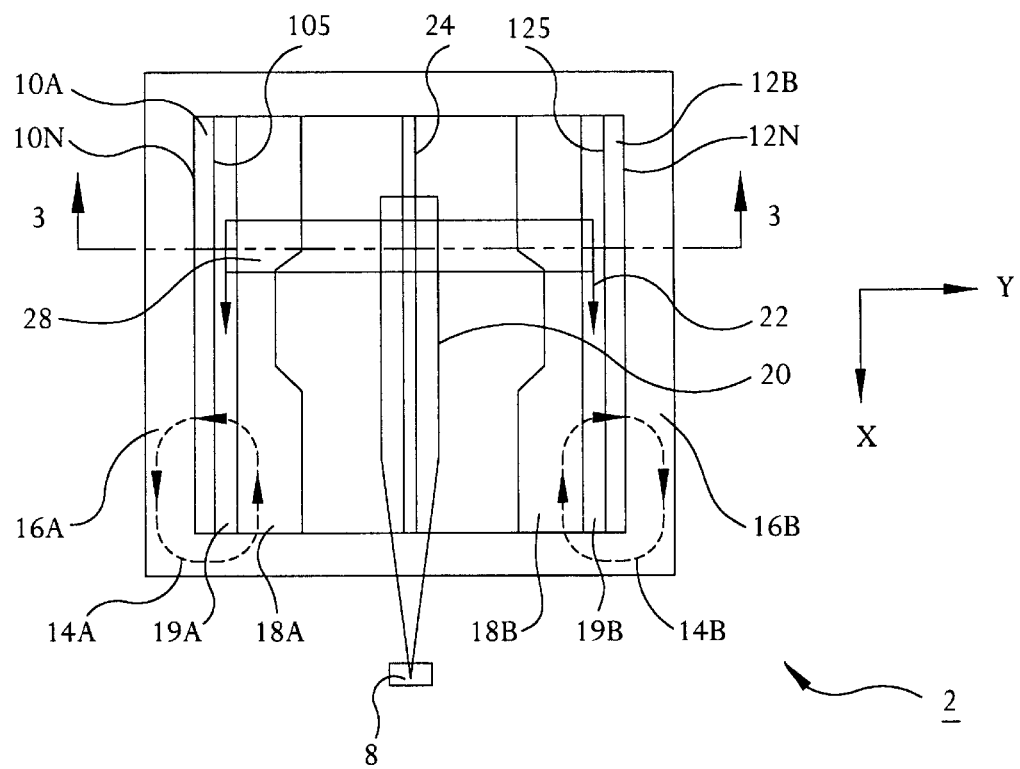
FIG. 2 is an underside view of an exemplary magnetic circuit and an actuator carriage assembly.

The present invention provides a solution to the problem of actuator resonance by biasing the magnets 10A and 12B (FIGS. 2–5) which comprise the magnetic circuit 2. Referring to the drawings, there is shown in FIG. 4 an underside view of an exemplary magnetic circuit and an actuator carriage assembly in cooperation with one embodiment of the present invention.

Figure 4:
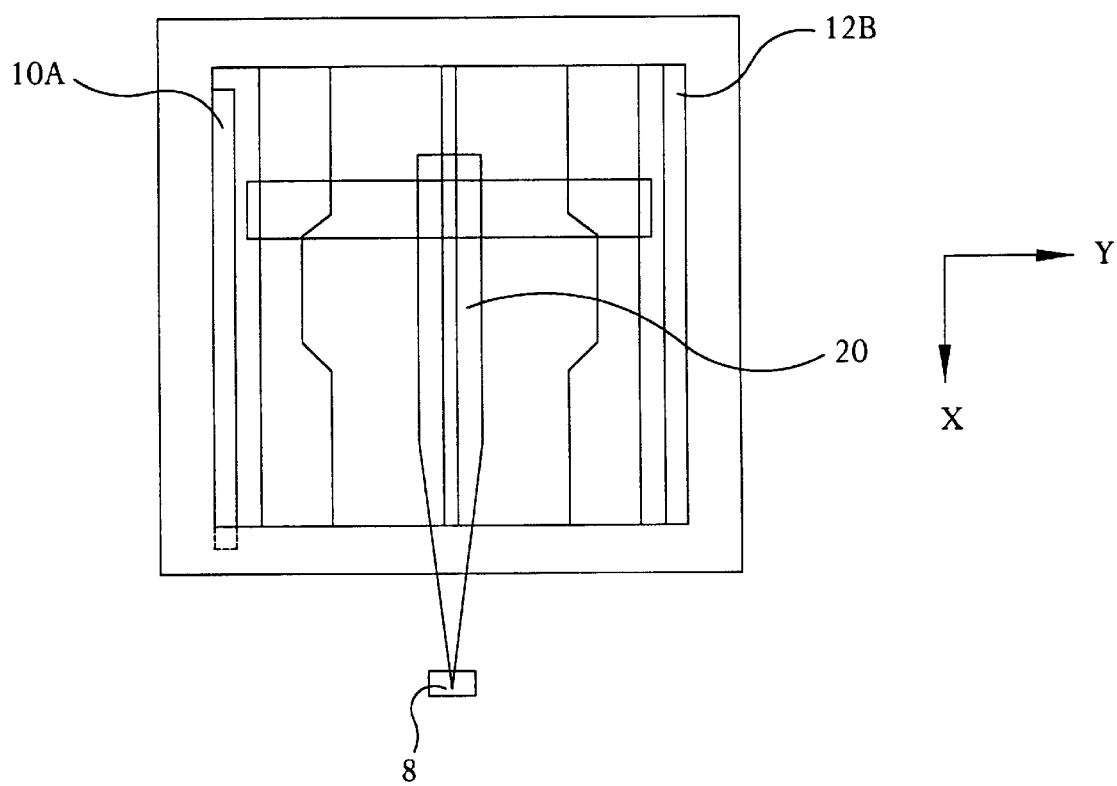
FIG. 4 is an underside view of an exemplary magnetic circuit and an actuator carriage assembly in cooperation with one embodiment of the present invention.

The first embodiment shown in FIG. 4 biases the magnets 10A and 12B by mis-aligning the magnets 10A and 12B. As shown in FIG. 4, magnet 10A is positioned slightly forward (in the x direction toward the storage medium). A misalignment of approximately 0.1 mm. will suffice. This misalignment biases the magnets 10A and 12B so that the magnetic flux 14A from magnet 10A is in greater contact with the actuator carriage assembly 20 than that from magnet 12B when the read/write heads 8 are accessing the inner diameter of the storage medium, thus making magnet 10A stronger than magnet 12B at the location where the actuator carriage assembly is most likely to resonate.

In similar ways, all embodiments of the current invention have the common feature of making the magnetic flux on the side of the actuator carriage assembly containing magnet 10A stronger than that on the side containing magnet 12B. Alternatively and equivalently, making the magnetic flux on the second side (that with magnet 12B) weaker than that of the first side (that with magnet 10A) works just as well. Thus, one embodiment of the present invention is a magnetic circuit in which magnet 10A is stronger than 12B.

Figure 5:
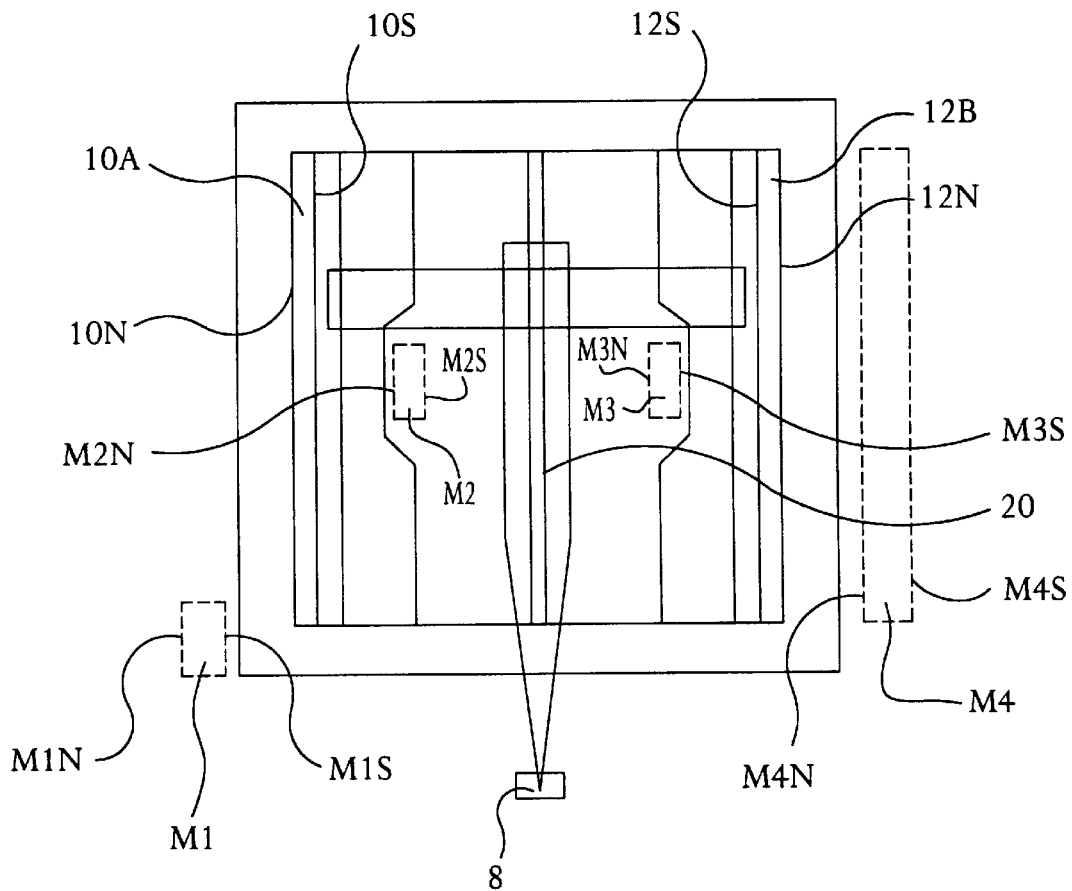
FIG. 5 is an underside view of an exemplary magnetic circuit and an actuator carriage assembly in cooperation with various alternative embodiments of the present invention.

FIG. 5 is an underside view of an exemplary magnetic circuit 2 and an actuator carriage 20 assembly in cooperation with various alternative embodiments of the present invention. FIG. 5 depicts four different embodiments of the current invention. The presence of magnets M1, M2, M3 and M4, depicted by dashed lines, each represent an alternative embodiment.

The placement of magnets M1 and M2 strengthen the first side of the actuator carriage assembly 20, while the placement of magnets M3 and M4 weaken the second side of the actuator carriage assembly 20. Magnets Ml and M2 have the same orientation of magnetic poles as does magnet 10A, thereby strengthening the magnetic flux from the first side of the actuator carriage assembly 20. That is, magnets 10A, M1 and M2 all have respective south poles 10S, M1S and M2S facing the actuator carriage assembly 20.

In the other two alternative embodiments shown in FIG. 5, magnets M3 and M4 have the opposite orientation of magnetic poles as does magnet 12B, thereby weakening the magnetic flux from the second side of the actuator carriage assembly 20. That is, magnet 12B has its south pole facing the actuator carriage assembly 20, while magnets M3 and M4 have their respective north poles M3N and M4N facing the actuator carriage assembly 20. It should be noted that the embodiments depicted in FIG. 5 are illustrative only, i.e., slight modifications in the placement of or the number of magnets added will work just as well as those disclosed in the figure and work within the principles of the present invention.

The benefit of the present invention lies in the biasing of the magnets of the magnetic circuit 2. If the magnetic flux 14A from the first side of the actuator carriage assembly 20 is greater than the magnetic flux 14B from the second side of the actuator carriage assembly 20, then resonance of the actuator carriage assembly 20 occurring when the read/write heads 8 are accessing the inner diameter of the storage media is eliminated.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. An actuator carriage assembly for carrying read/write heads into engagement with a storage medium while eliminating resonance of the actuator carriage assembly, the assembly comprising:

a carriage having read/write heads, the heads being mounted on the carriage;

a magnetic circuit for driving the carriage and heads into and out of engagement with the medium, the magnetic circuit comprising:

a coil mounted on the carriage; and a first magnet located on a first side of the actuator carriage assembly and a second magnet located on a second side of the actuator carriage assembly, the first side of the actuator carriage assembly having a stronger over all magnetic flux than the second side of the actuator carriage assembly.

2. The actuator carriage assembly of claim 1, wherein said first magnet is stronger than said second magnet.

3. The actuator carriage assembly of claim 1, wherein the actuator carriage assembly further comprises a third magnet located on the second side of the carriage assembly, said third magnet having the opposite orientation of magnetic poles as does said second magnet.

4. The actuator carriage assembly of claim 1, wherein the actuator carriage assembly further comprises a third magnet located on the first side of the carriage assembly, said third magnet having the same orientation of magnetic poles as does said first magnet.

5. An actuator carriage assembly for carrying read/write heads into engagement with a storage medium while eliminating resonance of the actuator carriage assembly, the assembly comprising:

a carriage having read/write heads, the heads being mounted on the carriage;

a magnetic circuit for driving the carriage and heads into and out of engagement with the medium, the magnetic circuit comprising:

a coil mounted on the carriage; and a first magnet located on a first side of the actuator carriage assembly and a second magnet located on a second side of the actuator carriage assembly, the first side of the actuator carriage assembly having a first magnetic flux and the second side of the actuator carriage assembly having a second magnetic flux such that the first magnetic flux is in greater contact with the actuator carriage assembly than the second magnetic flux when the heads are positioned proximate an inner portion of the medium.

6. The actuator carriage assembly of claim 5, wherein said first magnet is in a position slightly more forward than the position of said second magnet, the forward direction being the direction in which the heads move toward the storage medium.

7. In a magnetic disk drive having an actuator carriage assembly for carrying read/write heads into engagement with a storage medium, a method for eliminating resonance of the actuator carriage assembly comprising any one of the following steps of:

a) wherein the actuator carriage assembly comprises a magnetic circuit having a first magnet located on a first side of the assembly and a second magnet located on a second side of the assembly, making said first magnet stronger than said second magnet;

b) wherein the actuator carriage assembly comprises a magnetic circuit having a first magnet located on a first side of the assembly and a second magnet located on a second side of the carriage assembly, placing said first magnet in a position slightly more forward than the position of said second magnet, the forward direction being the direction in which the heads move toward the storage medium; and (c) wherein the actuator carriage assembly comprises a magnetic circuit having a first magnet located on a first side of the assembly and a overall second magnet located on a second side of the assembly, making the overall magnetic flux on the first side of the assembly stronger than the overall magnetic flux on the second side of the assembly.

8. The method of claim 7, wherein step (c) is performed by placing a third magnet located on the second side of the carriage assembly, said third magnet having the opposite orientation of magnetic poles as does said second magnet.

9. The method of claim 7, wherein step (c) is performed by placing a third magnet on the first side of the carriage assembly, said third magnet having the same orientation of magnetic poles as does said first magnet.

* * * * *